United States Patent Office 3,172,899
Patented Mar. 9, 1965

3,172,899
ORGANOSILANES AND ORGANOSILOXANES CONTAINING POLYOXYALKYLENE
Donald L. Bailey, Snyder, N.Y., assignor to Union Carbide Corporation, a corporation of New York
No Drawing. Filed Nov. 30, 1962, Ser. No. 241,183
7 Claims. (Cl. 260—448.2)

This invention relates to novel organosilicon compounds and processes for their production.

This invention provides siloxanes that contain at least one unit that is represented by the formula:

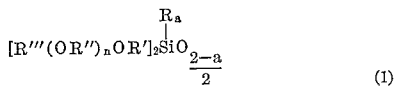
(1)

wherein R is a monovalent hydrocarbon radical or a halogenated monovalent hydrocarbon radical, R' is a divalent hydrocarbon radical, R" is an alkylene radical containing at least two carbon atoms, R''' is a hydrogen atom, a saturated hydrocarbon radical or an aromatic hydrocarbon radical, $n$ is an integer having a value of at least one and $a$ has a value of 0 or 1. In Formula 1, R can represent the same or different radicals and $n$ preferably has a value from 4 to 30. In Formula 1, R" can represent the same or different radicals i.e. the group $$-(OR'')_n-$$

can represent, for example, the groups:

$-(OC_2H_4)_p-$, $-(OC_2H_4)_p(OC_3H_6)_q-$, $-(OC_3H_6)_p-$, or $-(OC_2H_4)_p(OC_8H_{16})_q-$ where $p$ and $q$ are integers having a value of at least one.

Illustrative of the monovalent hydrocarbon radicals represented by R in Formula 1 are the linear aliphatic radicals (e.g. the methyl, ethyl and octadecyl radicals), the cycloaliphatic radicals (e.g. the cyclohexyl and the cyclopentyl radicals), the aryl radicals (e.g. the phenyl, tolyl, xenyl and naphthyl radicals), the aralkyl radicals (e.g. the benzyl and beta-phenylethyl radicals), the unsaturated linear aliphatic radicals (e.g. the vinyl, allyl and hexenyl radicals) and the unsaturated cycloaliphatic radicals (e.g. the cyclohexenyl radical).

Illustrative of the halogenated monovalent hydrocarbon radicals represented by R in Formula 1 are the halogenated alkyl radicals (e.g. the chloromethyl, gamma-chloropropyl and tetrafluorethyl radicals), the halogenated alkenyl radicals (e.g. the trifluorovinyl and chlorodifluoro-vinyl radicals) and the halogenated aryl radicals (e.g. the alpha,alpha,alpha-trifluorotolyl, bromophenyl and tetrabromoxenyl radicals).

Illustrative of the divalent hydrocarbon radicals represented by R' in Formula 1 are the alkylene radicals (e.g. the methylene, ethylene, 1,3-propylene, 1,4-butylene and 1,18-octadecylene radicals), the arylene radicals (e.g. the phenylene radical) and the alkarylene radicals (e.g. the phenylethylene radicals). In Formula 1, R' is preferably an alkylene radical.

Illustrative of the alkylene radicals containing at least two carbon atoms represented by R" in Formula 1 are the ethylene, 1,2-propylene, 1,3-propylene, 1,6-hexylene, 2-ethylhexylene-1,6 and 1,18-octadecylene radicals.

Illustrative of the saturated hydrocarbon radicals represented by R''' in Formula 1 are the saturated linear or branched chain aliphatic hydrocarbon radicals (e.g. the methyl, ethyl, propyl, n-butyl, tert-butyl and octadecyl radicals) and the saturated cycloaliphatic hydrocarbon radicals (e.g. the cyclopentyl and cyclohexyl radicals). Illustrative of the aromatic hydrocarbon radicals represented by R''' in Formula 1 are the aryl hydrocarbon radicals (e.g. the phenyl, tolyl, naphthyl and xenyl radicals) and the aralkyl hydrocarbon radicals (e.g. the benzyl and beta-phenylethyl radicals).

This invention further provides a process for producing siloxanes that contain at least one group that is represented by Formula 1 which process involves reacting a silicone polymer containing at least one group that is represented by the formula:

(2)

wherein R, R' and $a$ have the meanings defined for Formula 1 and X is a halogen atom, preferably a chlorine atom, and a salt represented by the formula:

$$R'''(OR'')_nOM \quad (3)$$

wherein R", R''' and $n$ have the meanings defined for Formula 1 and M is an alkali metal, preferably sodium or potassium. This process is referred to herein as the "metathesis process."

This invention still further provides a process for producing those siloxanes that contain at least one group that is represented by Formula 1 wherein R' is an alkylene group containing at least two carbon atoms which process involves reacting a silicone polymer containing at least one group represented by the formula:

(4)

wherein R and $a$ have the meanings defined for Formula 1, and an alkenyl ether represented by the formula:

$$R'''(OR'')_nOB \quad (5)$$

wherein R", R''' and $n$ have the meanings defined for Formula 1 and B is an alkenyl group, in the presence of a platinum catalyst. This process is referred to herein as the "addition process."

The siloxanes of this invention include both homopolymeric siloxanes containing only units represented by Formula 1 and copolymeric siloxanes containing at least one unit represented by Formula 1 and at least one unit represented by the formula:

(6)

wherein R has the above-defined meaning and $b$ has a value from 1 to 3. Limited amounts of $SiO_2$ groups and dihydrogensiloxy groups represented by Formula 4 can also be present in the siloxanes of this invention. In Formula 6, R can represent the same or different radicals.

The metathesis process employed in producing the siloxanes of this invention involves a metathesis reaction that is represented by the equation:

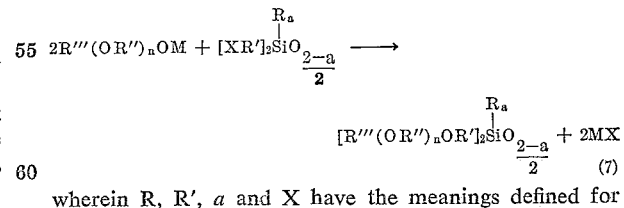

wherein R, R', $a$ and X have the meanings defined for Formula 2 and R''', R", $n$ and M have the meanings defined for Formula 3.

The silicone polymers that are used as starting materials in producing the siloxanes of this invention by the metathesis process contain at least one group that is represented by Formula 2 and can also contain one or more groups that are represented by Formula 6. These starting silicone polymers can be produced by various known processes. By one known process, an organochlorosilane (e.g. methyltrichlorosilane) and a chlorinating agent (e.g. sulfuryl chloride in the presence of a peroxide and chlorine in the presence of an iron catalyst), are reacted to produce a chloroorganochlorosilane. The chloroorganochlorosilane so produced is hydrolyzed and condensed along with, if desired, organochlorosilanes (e.g. dimethyldichlorosilane) to produce the starting silicone. By another process, a starting silicone is produced by reacting a silicone polymer containing hydrogen bonded to silicon and a halogen-substituted olefin (e.g. allyl chloride) in the presence of a platinum catalyst to produce the starting silicone polymer.

The salts that are used as starting materials in producing the siloxanes of this invention by the metathesis process (i.e. compounds represented by Formula 3) include both salts of monomeric hydroxyl compounds (e.g. $CH_3OCH_2CH_2OH$) and salts of polymeric hydroxy compounds (e.g. hydroxy end-blocked oxyethylene or oxypropylene polymers). These hydroxy compounds can contain one or two hydroxy end-blocking groups. Suitable hydroxyl end-blocked oxyalkylene polymers can be produced by known processes such as the process described in U.S. Patents 2,448,664, 2,425,755 and 2,425,845. One such process for producing hydroxyl end-blocking oxyalkylene polymers involves the addition of an oxyalkylene oxide to a compound containing one or two hydroxyl groups (termed a "starter") such as water, butylene, 2-ethyl hexanediol and the like to produce the oxyalkylene polymer. The hydroxy compounds are converted to the starting salts used in the metathesis process by reacting the hydroxy compounds with an alkali metal hydroxide or with an alkali metal alkoxide to produce the starting salt. Alternately the hydroxy compounds can be converted to starting salts by reacting the hydroxy compounds and an alkali metal hydride to produce the starting salt and, as a by-product, hydrogen.

The temperature used in producing the siloxanes of this invention by the metathesis process is not narrowly critical. Temperatures of from 50° C. to 200° C. are useful but temperatures of from 80° C. to 150° C. are preferred. Although other temperatures may be used it has been found desirable to produce the siloxanes by adhering to the indicated temperature ranges.

The metathesis reaction represented by Equation 7 is conveniently conducted within a liquid organic compound in which the starting silicone and the starting salt are mutually soluble. By way of illustration, a solution containing a liquid organic compound (such as toluene, benzene, xylene, dibutyl ether or cyclohexane), the starting silicone and the starting salt can be formed and then the mixture can be heated to cause the siloxane and the salt to react within the liquid organic compound to produce a siloxane of this invention. Preferred liquid organic compounds in which the starting materials can be dissolved are toluene and xylene. The amount of the liquid organic compound used is not narrowly critical and can vary from 25 parts by weight to 100 parts by weight of the liquid organic compound per 100 parts by weight of the starting compounds. Preferably, from 100 parts by weight to 500 parts by weight of the liquid organic compound per 100 parts by weight of the starting compound are used. Since the amount of the liquid organic compound is not critical, departures from the indicated amounts are permissible but produce no particular beneficial effect.

At conclusion of the reaction represented by Equation 7, the liquid organic compound in which reaction was conducted can be removed from the siloxane formed in the reaction by heating the mixture to volatilize the liquid organic compound, preferably at subatmospheric pressure.

The alkali metal halide (i.e. MX) produced in the reaction represented by Equation 7 usually precipitates from the reaction mixture used in producing the siloxanes of this invention. These alkali metal halides are conveniently separated from the reaction mixture by filtering the reaction mixture or by centrifuging the reaction mixture and decanting the liquid portion.

The relative amount of the reactants used in the metathesis process is not narrowly critical. Amounts of starting compounds that provide either stoichiometric amounts of —OM and silicon-bonded, halogen-substituted monovalent hydrocarbon groups or a small excess of the latter groups are usually preferred.

The metathesis process is preferred over the addition process in producing siloxanes of this invention containing silicon-bonded olefinically unsaturated groups. Such groups can undergo undesirable side reaction during the addition process but remain intact during the metathesis process.

The addition process used in producing siloxanes of this invention involves an addition reaction that can be represented by the equation:

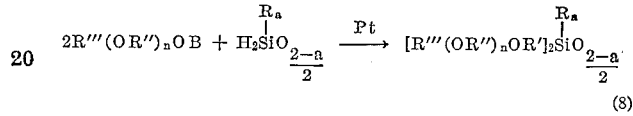

(8)

wherein $R'''$, $R''$, $n$ and B have the meanings defined for Formula 5, R and $a$ have the meaning defined for Formula 1 and $R'$ is an alkylene radical containing at least two carbon atoms. The alkenyl radical represented by B is converted to an alkylene radical represented by $R'$ in the reaction represented by Equation 8. The addition process is conveniently conducted at a temperature from 25° C. to 200° C.

The starting silicone polymers used in producing the siloxanes of this invention by the addition process contain at least one group represented by Formula 4 and can also contain one or more groups represented by Formula 6. These starting silicones can be produced by known procedures. By way of illustration a starting silicone can be produced by hydrolyzing and condensing a hydrogenhalosilane (such as dihydrogendichlorosilane) along with, if desired, a hydrocarbonhalosilane (e.g. dimethyldichlorosilane) to produce a starting siloxane. As a further illustration, a starting silicone can be produced by equilibrating a hydrogensiloxane (such as dihydrogensiloxane cyclic tetramer) and a hydrocarbonsiloxane (e.g. dimethylsiloxane cyclic tetramer and/or hexamethyldisiloxane) in the presence of an acidic catalyst (e.g. sulfuric acid) to produce a starting silicone.

The starting alkenyl ethers used in producing the siloxanes of this invention by the addition process can be produced by known processes. By way of illustration, a monomeric hydroxy compound (e.g. $CH_3OCH_2CH_2OH$) or a hydroxy end-blocked oxyalkylene polymer (e.g. $CH_3O(C_2H_4O)_{16}H$) and acetylenically unsaturated aliphatic compound (e.g. acetylene) can be reacted in the presence of a catalyst (e.g. potassium hydroxide) to produce a starting alkenyl ether (e.g.

or $CH_3(C_2H_4O)_{16}OCH{=}CH_2$). Hydroxy end-blocked oxyalkylene polymers that are useful in producing these starting alkenyl ethers are disclosed in United States Patents 2,448,664, 2,425,755 and 2,425,845.

In those cases where $R'''$ in Formula 5 represents a hydrogen atom, it is preferable to convert the hydroxy group in the starting alkenyl ether to a triorganosiloxy group (e.g. a trimethylsiloxy group), for example by reacting the ether with a triorganohalosilane (e.g. trimethylchlorosilane), prior to employing the ether as a reactant in the addition process. The conversion of these hydroxy groups to triorganosiloxy groups prevents undesirable side reactions (e.g. reaction of the hydroxy groups and the silicon-bonded oxygen atoms in the starting silicon polymer). After the siloxane has been produced the triorganosiloxy group can be hydrolyzed and the hydroxy group regenerated.

The platinum catalyst used in the addition process for producing the siloxanes of this invention include finely divided elemental platinum (supported, if desired, on materials such as charcoal, asbestos and/or silica gel) and platinum compounds such as chloroplatinic acid. The preferred catalyst is finely divided platinum supported on the gamma allotrope of alumina. Amounts of catalysts that provide from 0.001 to 5.0 parts by weight of platinum per 100 parts by weight of the reactants are generally useful. At the completion of the reaction, the catalyst can be removed from the reaction mixture by suitable means, e.g. by filtration.

The reaction represented by Equation 8 can be conducted within a liquid organic compound (solvent) in which the reactants are mutually soluble. Suitable solvents include xylene, toluene, benzene, n-butyl ether. The amount of the liquid organic compound used is not narrowly critical and can vary from 25 parts by weight to 100 parts by weight of the liquid organic compound per 100 parts by weight of the starting compounds. Preferably, from 100 parts by weight to 500 parts by weight of the liquid organic compound per 100 parts by weight of the starting compounds are used. Since the amount of the liquid organic compound is not critical, departures from the indicated amounts are permissible but produce no particular beneficial effect. At the completion of the reaction, the solvent can be removed from the reaction mixture by suitable means, e.g. by heating the reaction mixture to volatize the solvent.

The relative amounts of the starting materials used in the addition process is not narrowly critical. Amounts of the starting materials that provide stoichiometric amounts of dihydrogensiloxane groups and alkenyloxy groups are preferred although other amounts can be used.

In the above-described metathesis and addition processes suitable alkoxysilanes can be employed as reactants in lieu of the indicated starting silicone polymers. When suitable alkoxysilanes are employed in these processes, the product is an alkoxysilane having two $$R'''(OR'')_nOR'—$$

groups bonded to silicon. Such products can be converted to the siloxanes of this invention by conventional hydrolysis and condensation procedures. Suitable starting alkoxysilanes that can be used in the metathesis process are those represented by the formula:

$$[XR']_2\overset{R_a}{\underset{|}{Si}}(alkoxy)_{2-a} \qquad (9)$$

wherein R, R', X and $a$ have the meanings defined for Formula 2, and alkoxy represents a methoxy, ethoxy, propoxy or butoxy radical. Suitable starting alkoxysilanes that can be used in the addition process are those represented by the formula:

$$H_2\overset{R_a}{\underset{|}{Si}}(alkoxy)_{2-a} \qquad (10)$$

wherein R and $a$ have the meanings defined for Formula 1. Hydrocarbon(alkoxy)silanes, i.e. silanes represented by the formula:

$$R_bSi(alkoxy)_{4-b} \qquad (11)$$

wherein R and $b$ have the meanings defined for Formula 6, can be cohydrolyzed and cocondensed by conventional procedures with alkoxysilanes containing two $$R'''(OR'')_nOR'—$$

bonded to silicon in order to produce siloxanes of this invention containing both units represented by Formula 1 and units represented by Formula 6.

The silicone content of the siloxanes of this invention can be increased by an equilibration process which involves reacting a siloxane of this invention and a conventional silicone polymer in the presence of an equilibration catalyst to produce a siloxane of this invention having a higher silicone content than the starting siloxane of this invention.

Suitable equilibration catalysts include such basic compounds as the alkali metal oxides, hydroxides and silanolates and tetraorganoammonium hydroxides and silanolates. Preferably, the equilibration catalyst is potassium dimethylsilanolate or tetramethylammonium hydroxide or silanolate. The amount of the basic compound used as equilibration catalyst is not narrowly critical and can range from 0.005 part to 2.0 parts by weight of the basic compound per 100 parts by weight of the reactants, but preferably from 0.01 part to 1.0 part by weight of the basic compound per 100 parts by weight of the reactants are employed. Other than the indicated amounts of the catalysts are usually not as beneficial but can be used if desired.

The temperature used in the equilibration process can vary widely. The equilibration process can be conducted at a temperature of from 25° C. to 200° C. but preferably from 80° C. to 160° C. Other than the indicated temperature can be employed in the equilibration process but it is not particularly desirable to deviate from the indicated ranges since no commensurate advantage is obtained.

Occasionally, it is desirable to mix the siloxane of this invention and the conventional silicone polymer with a liquid organic compound in which they are mutually soluble and then conduct the equilibration process within the liquid organic compound. The use of such liquid organic compounds is indicated in those cases where the siloxane and/or the silicone are viscous and hence difficult to mix adequately and bring into reactive contact. Illustrative of the liquid such organic compounds are liquid hydrocarbon such as toluene, benzene and the like. The amount of the liquid organic compound used is not narrowly critical and can vary from 25 parts by weight to 100 parts by weight of the liquid organic compound per 100 parts by weight of the starting compounds. Preferably, from 100 parts by weight to 500 parts by weight of the liquid organic compound per 100 parts by weight of the starting compounds are used. Since the amount of the liquid organic compound is not critical, departures from the indicated amounts are permissible but produce no particular beneficial effect. However, the equilibration process is preferably conducted without such a liquid organic compound.

In general, any conventional silicone polymer is useful as a reactant in the equilibration process. Illustrative of useful silicone polymers are cyclic siloxanes such as dimethylsiloxane cyclic trimer and dimethylsiloxane cyclic tetramer.

The siloxanes of this invention possess excellent high temperature lubricating properties and are particularly useful as lubricants for steel surfaces. In addition, they can be dispersed or dissolved in suitable carriers (e.g. water, alcohols, ketones, etc.) and applied to molds on which they function as superior mold release agents after the carrier is volatilized. Other applications in which the siloxanes of this invention can be used to advantage are as hydraulic fluids, damping fluids and emulsifying agents for mixture of water and organic solvents (e.g. toluene). An outstanding property of the siloxanes of this invention that renders them particularly useful in the above applications is their stability both in acidic and strongly basic environments and at elevated temperatures.

The following examples illustrate the present invention: In the following examples and in the claims "Me" represents the methyl group and —$C_3H_6$— denotes the 1,2-propylene group (i.e. the group:

$$-CH_2\overset{CH_3}{\underset{|}{C}}H-)$$

*Example I*

A solution was formed in a 500-cc. flask that was equipped with a thermometer, a reflux condenser and a magnetic stirrer. The solution contained 74.0 g. (0.1 mole) of an oxyalkylene polymer that had the average formula: $C_4H_9(OC_3H_6)_{11}OCH=CH_2$, 22.6 g. (0.023 mole) of a silicone polymer that had the formula:

$$Me_3SiO(H_2SiO)_{2.75}(Me_2SiO)_{9.6}SiMe_3$$

50.0 g. of n-butyl ether, and 0.5 g. (5.2 parts by weight per 100 parts by weight of the silicone polymer and the oxyalkylene polymer) of a platinum-on-gamma catalyst that contained 2 parts by weight of platinum per 100 parts by weight of platinum and gamma-alumina. The solution was heated at 140–150° C. for 10 hours during which time the solution refluxed. The contents of the flask were filtered to remove the catalyst and the filtrate so produced was subjected to reduced pressure to evaporate the n-butyl ether and produced a residue. The residue contained 88 g. of a siloxane of this invention that was a homogeneous oil having a viscosity of 69.6 centistokes at 100° F. The siloxane was found to contain 8.8 parts by weight of silicon per 100 parts by weight of the copolymer. Theoretically the siloxane should have contained 9.8 parts by weight of silicon per 100 parts by weight of the siloxane. The siloxane was insoluble in water and had the formula:

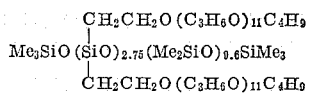

*Example II*

A silicone polymer composed of dimethylsiloxy units ($Me_2SiO$) and dihydrogen siloxy units ($H_2SiO$) in a ratio of 15:1 was reacted with an oxyalkylene polymer having the formula:

$$Me(OCH_2CH_2)_{17}OCH=CH_2$$

dissolved in n-butyl ether in the presence of a catalytic amount of platinum supported on the gamma allotrope of alumina. The product so formed was a siloxane of this invention that was insoluble in water and that was composed of dimethyl siloxy units and units represented by the formula:

$$[Me(OCH_2CH_2)_{17}OCH_2CH_2]_2SiO$$

in a ratio of 15 to 1.

*Example III*

The siloxane of this invention produced in Example II was evaluated as a lubricant in a Falex Lubricant Test Machine. The machine consists of a steel shaft and two steel V-blocks that are positioned so that they can be forced against the shaft. The shaft and the V-blocks are immersed in the lubricant to be tested. The shaft is rotated and a load is applied to the V-blocks, forcing them against the shaft. The load is increased until failure occurs (i.e. seizure between the rotating shaft and the V-blocks or a radical increase in wear with no increase in load). The load at which failure occurs is the "Falex Load" value for the lubricant. The Falex Load values for the siloxane of Example II and, for comparison, for various known fluids are as follows:

| Fluid: | Falex load (pounds) |
|---|---|
| Siloxane of Example II | 1500 |
| $C_4H_9(OC_3H_6)_6OH$ | 400 |
| $C_4H_9(OC_3H_6)_{17.7}OH$ | 1250 |
| Dimethylpolysiloxane oil | <100 |
| Gulf Security Oil "A" (a refined petroleum oil having a viscosity of about 44 SUS at 210° F.) | <500 |
| Kendall Automatic Transmission Oil (a refined paraffinic hydrocarbon oil having a viscosity of about 52 SUS at 210° F.) | <500 |

Siloxanes of this invention can be produced by the metathesis and addition processes described herein from starting silicone polymers and starting oxyalkylene polymers containing other groups in addition to those indicated above. By way of illustration, siloxanes can be produced by the addition process from the silicones described above as useful in the addition process and alkenyloxy end-blocked oxyalkylene polymers that contain groups derived from organic compounds containing three or more hydroxyl substituents. As a further illustration, siloxanes can be produced by either the addition or metathesis processes from starting silicones containing a polyvalent hydrocarbon group that is attached to two or more siloxane groups by carbon to silicon bonds. As a still further illustration, siloxanes can be produced by the addition process from the silicones described above as useful in the addition process and starting oxyalkylene polymers containing acrylate end-blocking groups. The latter mentioned addition process produces a siloxane containing a silicone moiety linked to an oxyalkylene moiety by a linkage containing a carbonyl group.

Starting oxyalkylene polymers that contain groups derived from organic compounds containing three or more hydroxyl substituents can be produced by employing organic compounds containing three or more hydroxyl substituents as starters in the reaction that produces the oxyalkylene polymer. Illustrative of such organic compounds containing three or more hydroxyl substituents are glycerine; 1,2,6-hexanetriol; 1,3,5-hexanetriol; trimethylolmethane; trimethylolethane and the like. Siloxanes produced containing from oxyalkylene polymers having units derived from such polyhydroxy compounds possess additional cross-linking due to the presence of the group derived from the polyhydroxy compound.

Starting silicone polymers containing hydrocarbon groups that are attached to two or more siloxane groups by carbon to silicon bonds can be produced from poly-(alkoxysilyl)alkanes by known processes. By way of illustration, poly(alkoxysilyl)alkanes such as bis(trialkoxysilyl)ethane, tris(triethoxysilyl)butane or tris(triethoxysilyl)hexane can be mixed with an alkoxysilane containing a silicon-bonded, halogen-substituted hydrocarbon group and, if desired, hydrocarbonalkoxysilanes and the mixture processed according to known hydrolysis and equilibration processes to produce the starting silicone polymer. The starting silicone polymer can then be used in producing siloxanes by the metathesis process.

Starting oxyalkylene polymers containing acrylate groups as end-blocking groups can be produced by known esterification processes. By way of illustration, these starting oxyalkylene polymers can be produced employing hydroxy end-blocked oxyethylene homopolymers

[e.g. $CH_3O(C_2H_4O)_mH$]

and methacrylic acid to produce an oxyalkylene polymer containing acrylate end-blocking groups such as the polymer represented by the graphical formula:

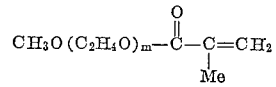

wherein $m$ is an integer that has a value of from 2 to 14. The latter-mentioned starting oxyalkylene polymer can be employed along with a silicone polymer containing silanic hydrogen as starting materials in the above-described addition process to produce a siloxane that contains a silicon moiety linked to an oxyalkylene moiety by a linkage which contains a carbonyl group.

The siloxanes of this invention have a wide variety of uses in the area of lubrication. Not only are the siloxanes useful per se as lubricants, but as little as one weight percent or less of the siloxanes can be added to water to produce an excellent aqueous lubricant. Moreover, the siloxanes of this invention can be blended with conventional lubricants (e.g. hydrocarbon lubricating oils) to improve the lubricating properties of the conventional lubricant. Other areas of use for the siloxanes of this invention are as anti-static agents and as anti-foam agents.

This application is a continuation-in-part of application Serial No. 823,300 filed June 29, 1959, now abandoned.

What is claimed is:

1. A siloxane comprising at least one unit that is represented by the formula:

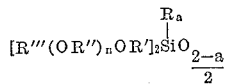

wherein R is a member selected from the group consisting of the monovalent hydrocarbon radicals and the halogenated monovalent hydrocarbon radicals, R' is a divalent hydrocarbon radical, R'' is an alkylene radical containing at least two carbon atoms, R''' is a member selected from the group consisting of the hydrogen atom, the saturated hydrocarbon radicals and the aromatic hydrocarbon radicals, $n$ is an integer having a value of at least one and $a$ has a value from 0 to 1, each silicon atom in each of said units having two said R'''(OR'')$_n$OR' moieties attached thereto.

2. The siloxane of claim 1 wherein R'' represents an ethylene group.

3. The siloxane of claim 1 wherein R'' represents a 1,2-propylene group.

4. A siloxane consisting essentially of (1) at least one unit that is represented by the formula:

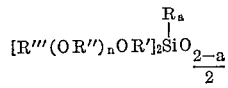

wherein R is a member selected from the group consisting of the monovalent hydrocarbon radicals and the halogenated monovalent hydrocarbon radicals, R' is a divalent hydrocarbon radical, R'' is an alkylene radical containing at least two carbon atoms, R''' is a member selected from the group consisting of the hydrogen atom, the saturated hydrocarbon radicals and the aromatic hydrocarbon radicals, $n$ is an integer having a value of at least one and $a$ has a value from 0 to 1, each silicon atom in each of said units having two said R'''(OR'')$_n$OR' moieties attached thereto, and (2) at least one unit that is represented by the formula:

wherein R has the above-defined meaning and $b$ has a value from 1 to 3.

5. A siloxane having the average formula:

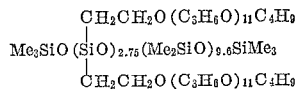

6. A siloxane consisting essentially of at least one dimethylsiloxy unit and at least one unit represented by the average formula:

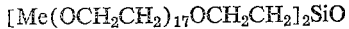

7. A silane represented by the formula:

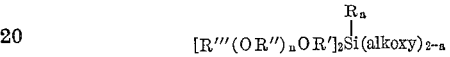

wherein R is a member selected from the group consisting of the monovalent hydrocarbon radicals and the halogenated monovalent hydrocarbon radicals, R' is a divalent hydrocarbon radical, R'' is an alkylene radical containing at least two carbon atoms, R''' is a member selected from the group consisting of the hydrogen atom, the saturated hydrocarbon radicals and the aromatic hydrocarbon radicals, $n$ is an integer having a value of at least one and $a$ has a value from 0 to 1 and alkoxy represents an alkoxy radical selected from the group consisting of the methoxy, ethoxy, propoxy and butoxy radicals.

References Cited in the file of this patent

UNITED STATES PATENTS

| | | |
|---|---|---|
| 2,823,218 | Speier et al. | Feb. 11, 1958 |
| 2,846,458 | Haluska | Aug. 5, 1958 |
| 2,889,349 | Garden et al. | June 2, 1959 |
| 2,970,150 | Bailey | Jan. 31, 1961 |
| 3,019,248 | Fekete | Jan. 30, 1962 |

FOREIGN PATENTS

| | | |
|---|---|---|
| 553,606 | Belgium | Jan. 15, 1957 |